United States Patent
Moyal et al.

(10) Patent No.: US 12,552,029 B2
(45) Date of Patent: Feb. 17, 2026

(54) CONTROLLING MOVEMENT TO AVOID RESONANCE

(71) Applicant: INTERNATIONAL BUSINESS MACHINES CORPORATION, Armonk, NY (US)

(72) Inventors: Shailendra Moyal, Pune (IN); Sarbajit K. Rakshit, Kolkata (IN); Akash U. Dhoot, Pune (IN)

(73) Assignee: International Business Machines Corporation, Armonk, NY (US)

(*) Notice: Subject to any disclaimer, the term of this patent is extended or adjusted under 35 U.S.C. 154(b) by 358 days.

(21) Appl. No.: 17/823,972

(22) Filed: Sep. 1, 2022

(65) Prior Publication Data

US 2024/0075616 A1    Mar. 7, 2024

(51) Int. Cl.
*B25J 9/16* (2006.01)

(52) U.S. Cl.
CPC ........... *B25J 9/1664* (2013.01); *B25J 9/1605* (2013.01); *B25J 9/162* (2013.01); *B25J 9/1638* (2013.01); *B25J 9/1653* (2013.01)

(58) Field of Classification Search
CPC ...... G05D 1/6987; G05D 1/645; G05D 1/249; G05D 1/225; G05D 2111/10;
(Continued)

(56) References Cited

U.S. PATENT DOCUMENTS

| 9,296,105 B2 | 3/2016 | Merry |
| 2004/0030447 A1* | 2/2004 | Takahashi ............ B62D 57/032 700/245 |

(Continued)

FOREIGN PATENT DOCUMENTS

| CN | 104123804 A | * 10/2014 | |
| CN | 110344959 A | * 10/2019 | .............. F02B 77/08 |

(Continued)

OTHER PUBLICATIONS

MythBusters, "Breakstep Bridge," YouTube, Aug. 15, 2013. https://www.youtube.com/watch?v=52C9N-4jw1k (accessed Apr. 30, 2025). (Year: 2013).*

(Continued)

*Primary Examiner* — Truc M Do
*Assistant Examiner* — Tyler Roger Robarge
(74) *Attorney, Agent, or Firm* — Michael O'Keefe

(57) ABSTRACT

According to one embodiment, a method, computer system, and computer program product for resonance avoidance is provided. The embodiment may include identifying one or more entities traversing a structure. The embodiment may also include identifying movement information and characteristic information for the one or more entities. The embodiment may further include performing a digital twin simulation of the structure based on the identified movement information and characteristic information. The embodiment may also include, in response to determining resonance between a natural frequency of the structure and a movement pattern of each entity based on the digital twin simulation, identifying one or more movement changes for each entity to eliminate resonance of the structure.

20 Claims, 3 Drawing Sheets

(58) Field of Classification Search
CPC ..... G05D 2109/12; B25J 9/1605; B25J 9/162;
B25J 9/1664; B25J 9/1638; B25J 9/1653;
B25J 9/16; G09B 25/02
See application file for complete search history.

(56) References Cited

U.S. PATENT DOCUMENTS

| | | | | |
|---|---|---|---|---|
| 2018/0126852 A1* | 5/2018 | Moriya | ................ | B60L 3/0023 |
| 2020/0082727 A1* | 3/2020 | Zhao | .................... | G08G 1/0116 |
| 2020/0101601 A1 | 4/2020 | Zhuo | | |
| 2020/0206905 A1 | 7/2020 | Han | | |

FOREIGN PATENT DOCUMENTS

| | | | | | |
|---|---|---|---|---|---|
| CN | 114444366 A | * | 5/2022 | ............. | G06F 17/15 |
| CN | 114444983 A | * | 5/2022 | ........... | G06T 7/0004 |
| CN | 114527770 A | * | 5/2022 | ........... | G05D 1/0221 |
| CN | 114580971 A | * | 6/2022 | | |
| KR | 102252712 B1 | * | 5/2021 | | |
| WO | 2018082330 A1 | | 5/2018 | | |
| WO | WO-2021108680 A1 | * | 6/2021 | ............. | G05B 17/02 |
| WO | WO-2023147375 A2 | * | 8/2023 | .......... | G01M 5/0091 |

OTHER PUBLICATIONS

Blekherman, "Internal Resonance in Pedestrian Bridges," International Journal of Bridge Engineering (IJBE), vol. 3, No. 3, Sep.-Dec. 2015, 35 pages.

How It Works Team, "How can resonance collapse bridges?," How it Works Daily, Dec. 16, 2012, https://www.howitworksdaily.com/how-can-resonance-collapse-bridges/, 8 pages.

Offshore Staff, "'Spot' deployed on Aker BP's Skarv FPSO," Offshore, Nov. 24, 2020, https://www.offshore-mag.com/business-briefs/equipment-engineering/article/14187978/spot-deployed-on-aker-bps-skarv-fpso-offshore-norway, 5 pages.

* cited by examiner

CONTROLLING MOVEMENT TO AVOID RESONANCE

BACKGROUND

The present invention relates generally to the field of computing, and more particularly to robotics controls.

Robotics relates to a branch of engineering and computer science focused on the design, manufacture, operation, and control of robots. A goal of robotics is the implementation of machines to replicate human actions, and even substitute for human in certain situation, such as environments too dangerous or activities not suitable for humans. For example, robots may be utilized in highly radioactive environments or in areas with unexploded munitions. The field of robotics lends heavily from various areas of engineering, including, but not limited to, mechanical engineering, electrical engineering, bioengineering, and computer engineering.

Robotics controls relates to systems that aid in the movement and direction of the movement of robots. Highly technical mechanical and computer systems interact to allow a robot to stabilize and move freely and require precise systems collaborating and communicating effectively for proper movement. Various types of controls are available within robotics, such as manual control, wireless control, semi-autonomous, and fully autonomous. The precision and accuracy of robotics enables use in many areas of modern society including, but not limited to, the fields of medicine and space exploration.

SUMMARY

According to one embodiment, a method, computer system, and computer program product for resonance avoidance is provided. The embodiment may include identifying one or more entities traversing a structure. The embodiment may also include identifying movement information and characteristic information for the one or more entities. The embodiment may further include performing a digital twin simulation of the structure based on the identified movement information and characteristic information. The embodiment may also include, in response to determining resonance between a natural frequency of the structure and a movement pattern of each entity based on the digital twin simulation, identifying one or more movement changes for each entity to eliminate resonance of the structure.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
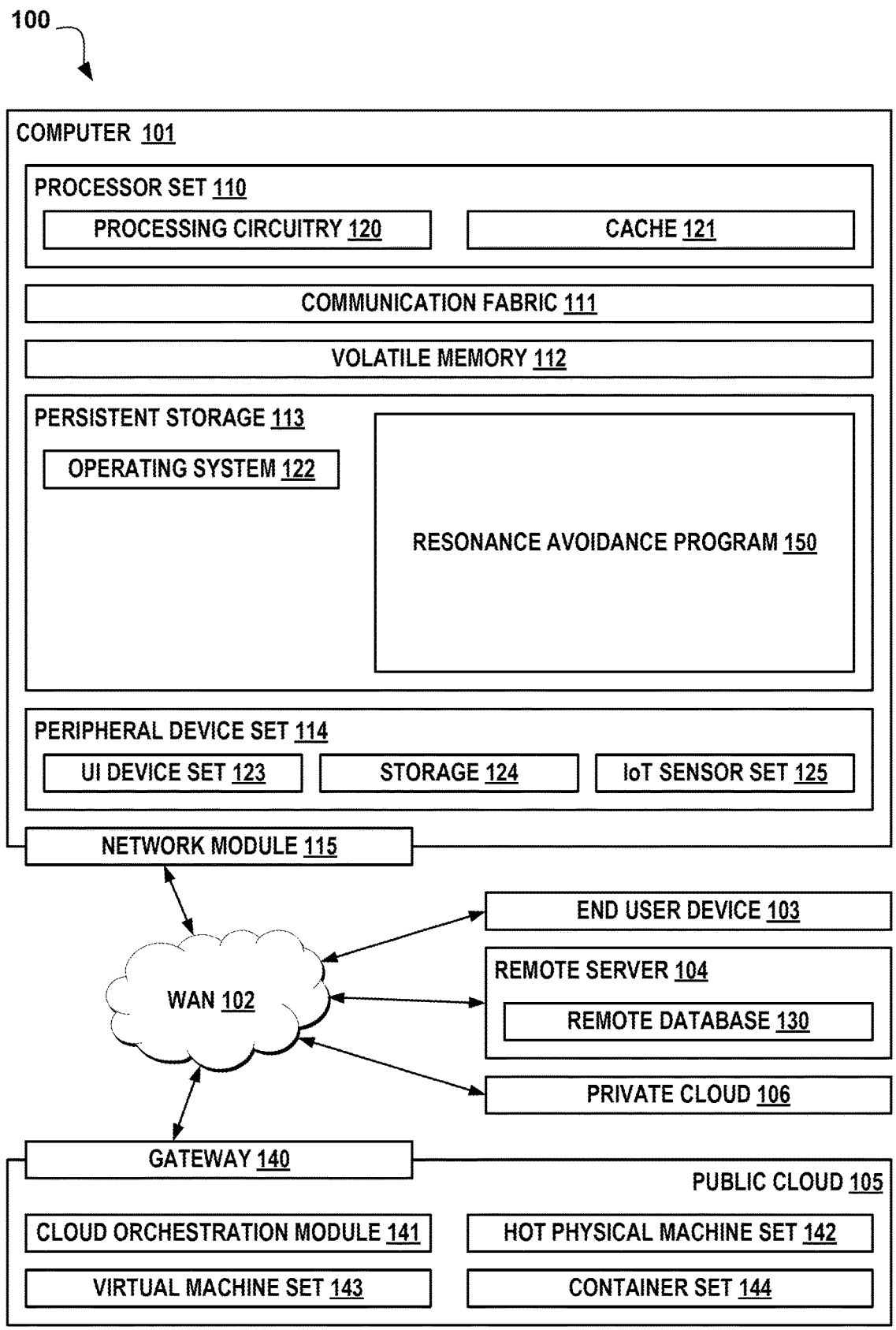
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to robotics controls. The following described exemplary embodiments provide a system, method, and program product to, among other things, calculate the natural frequency of a structure and modify the movement pattern and intensity of robotics traversing on or through the structure to avoid achieving resonance. Therefore, the present embodiment has the capacity to improve the technical field of robotics controls by ensuring the integrity of a structure or traversal path for organic and robotic entities.

As previously described, robotics relates to a branch of engineering and computer science focused on the design, manufacture, operation, and control of robots. A goal of robotics is the implementation of machines to replicate human actions, and even substitute for human in certain situation, such as environments too dangerous or activities not suitable for humans. For example, robots may be utilized in highly radioactive environments or in areas with unexploded munitions. The field of robotics lends heavily from various areas of engineering, including, but not limited to, mechanical engineering, electrical engineering, bioengineering, and computer engineering. Furthermore, robotics devices may effectuate movement through a number of various propulsion mechanisms, such as wheels, treads, turbines, and bipedal or quadrupedal movement.

Robotics controls relates to systems that aid in the movement and direction of the movement of robots. Highly technical mechanical and computer systems interact to allow a robot to stabilize and move freely and require precise systems collaborating and communicating effectively for proper movement. Various types of controls are available within robotics, such as manual control, wireless control, semi-autonomous, and fully autonomous. The precision and accuracy of robotics enables use in many areas of modern society including, but not limited to, the fields of medicine and space exploration.

In the fields of civil engineering and structural engineering, resonance is a real threat that is actively anticipated in the design process. Resonance is a natural phenomenon that occurs when an applied periodic force equals the natural frequency of an entity. When an entity reaches resonance, the entire system will oscillate with a higher amplitude than when the periodic force is applied at non-resonance frequencies. The resultant amplitude of the applied force may be significant enough to result in the failure or destruction of the system. As a famous example of the catastrophic effects of resonance, the Tacoma Narrows Bridge collapsed in 1940 as a result of wind applying periodic forces that matched the natural frequency of the structure. Although on a smaller scale, various pedestrian walkways may be subject to the same destructive forces.

With the emerging prevalence of robotic devices capable of terrestrial locomotion, such as Spot® (Spot® and all Spot®-based trademarks and logos are trademarks or registered trademarks of Boston Dynamic, Inc. and/or its affiliates) and Atlas™ (Atlas™ and all Atlas™-based trademarks and logos are trademarks or registered trademarks of Boston Dynamic, Inc. and/or its affiliates), robots with terrestrial locomotion (e.g., bipedal and quadrupedal robots) are capable of traversing various structures, surfaces, and platforms which performing tasks, such as repairs, inspections, and cargo transportation. While performing these various tasks, multiple robots with terrestrial locomotion may inadvertently create resonance with the surface or structure on which they are traversing and, possibly, compromising the integrity of the surface or structure. As such, it may be advantageous to, among other things, identify the natural frequency of a surface or structure and ensure robotic terrestrial locomotion on the surface or structure does not create destructive resonance.

According to at least one embodiment, various items of data regarding a surface or structure may be gathered in order to create a digital twin of the surface or structure. In at least one embodiment, a structure may relate to any surface used to traverse from a starting point to a destination point. As one or more entities traverse the surface or structure, the force and frequency of each entity's terrestrial locomotion across the surface or structure may be calculated. Using the generated digital twin, a simulation may be performed to determine if the calculated, or a prediction of the applied force and frequency of the terrestrial locomotion, will create destructive resonance on the surface or structure. If destructive resonance is calculated and/or predicted, the force and frequency of robotic terrestrial locomotion across the surface or structure may be modified in order to avoid damage or failure.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as resonance avoidance program 150. In addition to resonance avoidance program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and resonance avoidance program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in resonance avoidance program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in resonance avoidance program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network.

A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, resonance avoidance program 150 may generate a digital twin of an entity capable of traversal by robotic devices capable of terrestrial locomotion, predict whether one or more robotic devices are likely to cause damaging resonance of the entity due to the pattern, frequency, and force of each robotic device's movement, and transmit movement modification instructions to one or more robotic devices that reduce or eliminate the predicted resonance capable of damaging or destroying the entity. Furthermore, notwithstanding depiction in computer 101, resonance avoidance program 150 may be stored in and/or executed by, individually or in any combination, end user device 103, remote server 104, public cloud 105, and private cloud 106. The resonance avoidance method is explained in more detail below with respect to FIGS. 2 and 3.

Figure 2:
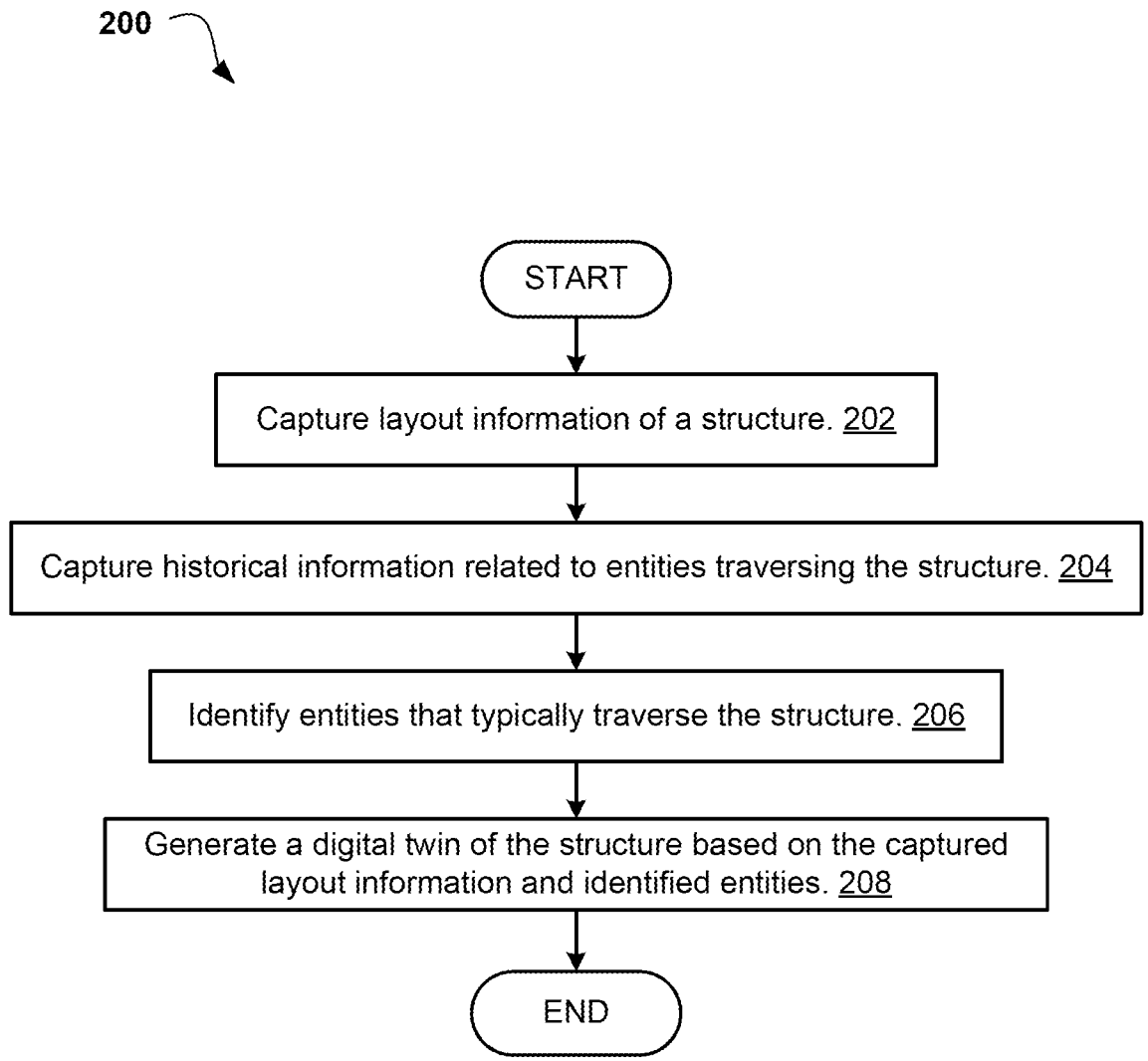
FIG. 2 illustrates an operational flowchart for a resonance avoidance implementation process according to at least one embodiment.

Referring now to FIG. 2, an operational flowchart for a resonance avoidance implementation process 200 is depicted according to at least one embodiment. At 202, the resonance avoidance program 150 captures layout information of a structure. In order to generate a digital twin of a structure, the resonance avoidance program 150 may capture various physical attributes of the structure. For example, an architectural floor plan of an industrial complex may be ingested into a computing device, such as computer 101. In one or more other embodiments, the resonance avoidance program 150 may capture physical attributes of a structure including, but not limited to, the structural layout, walkway length, walkway width, walkway floor thickness, construction material of each walkway, number of supports, location of each support, hand rail height, hand rail design, location of each handrail support connected to the walkway, and any other physical attribute that may be utilized to calculate the natural frequency of each traversable pathway within the structure.

Similarly, the resonance avoidance program 150 may utilize one or more sensors, such as IoT sensor set 125 to capture various data items necessary or useful in generating the digital twin of the structure. The sensors of IoT sensor set 125 may include, but are not limited to, proximity sensors, accelerometers, infrared sensors, pressure sensors, light sensors, ultrasonic sensors, touch sensors, color sensors, humidity sensors, position sensors, magnetic sensors (e.g., Hall effect sensor), sound sensors (e.g., microphones), tilt sensors (e.g., gyroscopes), flow sensors, level sensors, strain sensors, and weight sensors. Furthermore, although examples provided describe a structure as being the subject of the digital twin generation, any entity capable of traversal by a robotic device capable of terrestrial locomotion, such as a pathway or a platform, may be utilized. In addition to the forms described above, computer 101 may also take the form of a robotic device capable of terrestrial locomotion.

Then, at 204, the resonance avoidance program 150 captures information related to entities traversing the structure. As indicated above, the resonance avoidance program 150 may capture information utilizing the IoT sensor set 125. Thus, the resonance avoidance program 150 may utilize the IoT sensor set 125 to capture information, both historical and current, indicative of entities traversing on or throughout the structure. For example, the resonance avoidance program 150 may utilize cameras within an industrial complex to identify time of traversal and the type, number, movement pattern, movement type, and forces applied to a structure or pathway of robotic devices. Similarly, the resonance avoidance program 150 may communicate with a repository, such as storage 124, remote database 130, or private cloud 106, to obtain the above information relating to entities, such as robotic devices or organic beings, traversing the structure or associated pathways.

Next, at 206, the resonance avoidance program 150 identifies entities that typically traverse the structure. From the information relating to entities traversing the structure or pathway, the resonance avoidance program 150 may capture information that identifies each entity. For example, in a camera feed, the resonance avoidance program 150 may utilize image recognition technology to identify the type of entity traversing the structure or pathway at a specific time and the forces that entity may be applying. For example, the resonance avoidance program 150 may identify the entity type as a Spot® robotic device and, based on information captured from a repository, such as remote database 130 or private cloud 106, determine the forces applied by the robotic device with each step taken on the structure or pathway. Similarly, the resonance avoidance program 150 may identify the entity traversing the structure or pathway as an organic being of an estimated size based on the image recognition analysis of the data captured by one or more sensors from the IoT sensor set 125. As such, the resonance avoidance program 150 may calculate the traversal rhythm and force applied by the organic being with each step taken.

Furthermore, resonance avoidance program 150 may utilize the IoT sensor set 125 to identify typical activities performed on the structure or pathway. For example, a camera may capture robotic devices carrying or loading cargo along a specific section of the structure but walking unloaded along another section. The identified activities may be utilized when performing the digital twin simulation as an unloaded robotic device moving along the structure may affect the impact on the device's frequency differently than a loaded device at maximum carrying capacity.

In at least one embodiment, the resonance avoidance program 150 may store each entity that is identified as typically traversing the structure or pathway in a repository, such as storage 124, remote database 130, and private cloud 106. Information relating to each identified entity may be stored in a profile that contains metadata corresponding to the entity, such as, but not limited to, entity weight, entity size dimensions (e.g., height, widths, depth, etc.), movement frequency, unloaded traversal force applied to the structure or pathway, estimated maximum carrying capacity, and fully loaded traversal force applied to the structure or pathway.

Then, at 208, the resonance avoidance program 150 generates a digital twin of the structure based on the captured layout information and identified entities. Once the resonance avoidance program 150 has captured all available information from steps 202-206, the resonance avoidance program 150 may generate a digital twin of the structure or pathway that will be simulated upon a robotic mechanism being traversal of a preconfigured section of the structure or pathway. A digital twin may be a digital representation of the structure or pathway created in a virtual space that allows for simulation of the physical environment without the actual stresses and strains applied to the physical entity.

Figure 3:
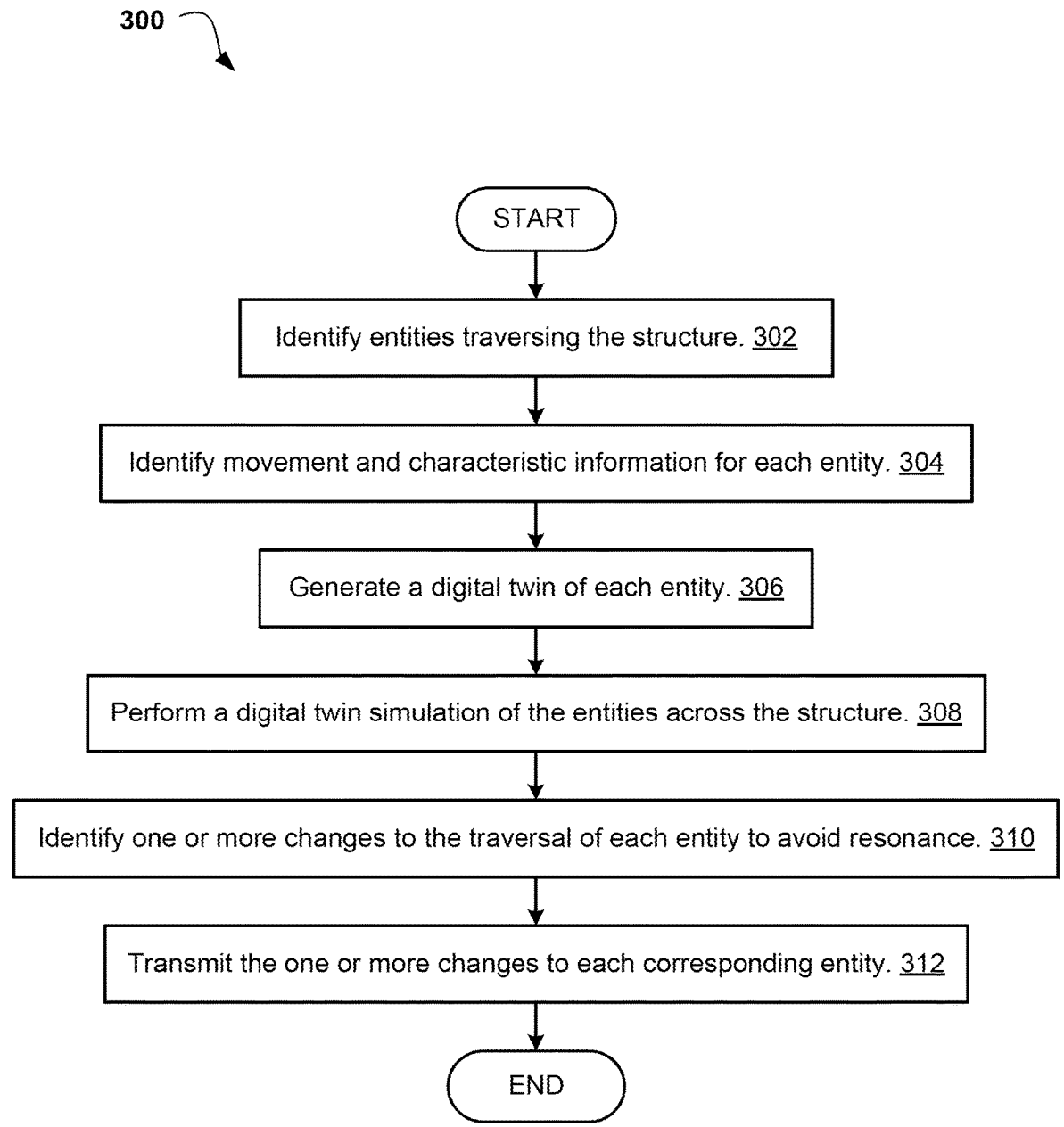
FIG. 3 illustrates an operational flowchart for a resonance avoidance operation process according to at least one embodiment.

Referring now to FIG. 3, an operational flowchart for a resonance avoidance operation process 300 is depicted according to at least one embodiment. At 302, the resonance avoidance program 150 identifies entities traversing the structure. The resonance avoidance program 150 may monitor one or more preconfigured entrances of a surface for the presence of entities wishing to traverse the surface. In order to perform a digital twin simulation of the effects of entities traversing a surface, the resonance avoidance program 150 may identify the robotic devices as they traverse the surface of a structure or walkway. The resonance avoidance program 150 may identify the presence of robotic devices through a variety of detection mechanisms including, but not limited to, pressure plates on the surface, image recognition of images captured from a camera viewing the surface, and laser sensors affixed at or near a preconfigured section of the surface. For example, the resonance avoidance program 150 may identify a robotic device has begun traversing a walkway in an industrial facility through movements detected on a pressure plate at the entrance of the walkway. Upon detecting the robotic device's presence, the resonance avoidance program 150 may identify other entities already traversing the surface through one or more sensors of IoT sensor set 125.

Next, at 304, the resonance avoidance program 150 identifies movement and characteristic information for each entity. Once an entity has been identified on or entering the surface, the resonance avoidance program 150 may identify movement and characteristic information of each entity traversing the surface including the entity identified as beginning traversal of the surface. In at least one embodiment, the movement information may include, but is not limited to, the frequency of the entity's locomotion, the speed of movement, an estimated force applied by each step, a current direction of movement, and an estimated destination. In at least one embodiment, the characteristic information may include, but is not limited to, the number of appendages by which the entity engages in terrestrial locomotion, a type of entity (e.g., organic or robotic), estimated dimensions of the entity (e.g., height, length, and width), and an estimated weight of the entity. If the entity is identified as a robotic device, the resonance avoidance program 150 may obtain available movement and/or characteristic information (e.g., system specifications) from the robotic device manufacturer on a third party repository, such as remote database 130 or public cloud 105. For example, upon identifying a robotic device carrying a load has begun traversing an elevated walkway in an industrial facility, the resonance avoidance program 150 may capture various items of movement and characteristic information of the robotic device along with movement and characteristic information of other entities already traversing the same elevated walkway.

Then, at 306, the resonance avoidance program 150 generates a digital twin of each entity. Using the identified movement and characteristic for each entity, the resonance avoidance program 150 may generate a digital twin for each entity using the identified movement and characteristic information similar to how the digital twin of the structure or surface was generated in step 208. For example, if the movement and characteristic information of the quadruped robotic device includes weight, height, length, width, step frequency, step force, movement speed, and movement direction, the resonance avoidance program 150 may generate a digital twin representation of the robotic device with the same specifications.

Next, at 308, the resonance avoidance program 150 performs a digital twin simulation of the entities across the structure. Once a digital twin of each entity traversing the structure has been generated, the resonance avoidance program 150 may perform a digital twin simulation of the structure to analyze the vibronic pattern (e.g., frequency and amplitude) of aggregated movements and forces on the structure. In order to perform the digital twin simulation, the digital twin of each entity may be inserted into or on the digital twin representation of the structure in the same location at which the entity is located in the physical world. For example, the digital twin representation of the robotic device generated in step 306 may be inputted to the location on which it intends to traverse the structure in the physical world and then simulated across the predicted traversal path based on the movement information captured in step 304. In placement of each entity on the structure at the location with which the respective entities are traversing the structure in the physical world, the resonance avoidance program 150 may more accurately perform the digital twin simulation in a manner that reflects how the physical world structure may reacts to the stresses and strains place on the structure by the movement of and forces applied by each entity.

Then, at 310, the resonance avoidance program 150 identifies one or more changes to the traversal of each entity to avoid resonance. The one or more changes to the traversal of each entity may include, but are not limited to, changing a pace of movement, changing an ambulation rate of an entity, changing the force with which an entity ambulates, changing an entity's location on the structure, changing an entity's location in relation to other entities on the structure, and changing a total number of entities present on the structure. Upon conducting the digital twin simulation, the resonance avoidance program 150 may calculate various data metrics resulting from the aggregated movement of the entities traversing the structure. These may metrics include, by are not limited to, total weight of all entities traversing the structure, the movement of live loads across the structure, location of each live load, total applied force to the structure, the aggregated frequency to the structure by the one or more entities, the aggregated amplitude applied to the structure by the one or more entities, and the natural frequency of the structure.

Since the natural frequency of the physical world structure may already be calculated, the resonance avoidance program 150 may be capable of determining if the calculated data metrics provided by the digital twin simulation reflect the structure reaching resonance as a result of the aggregated movements of entities. If the resonance avoidance program 150 determines resonance may be achieved as a result of the aggregated movements, the resonance avoidance program 150 may then determine whether the resonance will last for a sustained period sufficient to bring the amplitude to a damaging level and, even if brought to resonance for a preconfigured period of time, whether achieving resonance will damage, or bring to failure, the structure. If the aggregated movement does achieve resonance, the resonance avoidance program 150 may determine that the predicted pattern of movement will only achieve resonance with the structure for a de minimis period of time (e.g., one second) and the potential of any damage to the structure is below a threshold. As such, the resonance avoidance program 150 may not identify any changes to the movement of entities traversing the structure are needed. However, if the resonance avoidance program 150 determines that the achievement of resonance is above a threshold and/or will damage the structure regardless of the time period for which resonance is predicted to last, the resonance avoidance program 150 may determine that changes to the aggregated movement of entities on the structure is needed and proceed with identifying specific movements by each entity that should be taken to eliminate resonance.

In at least one embodiment, once the resonance avoidance program 150 determines that the achievement of resonance may damage the structure based on the digital twin simulation, the resonance avoidance program 150 may perform additional simulations to determine which movements by individual entities eliminate the resonance or reduce the amplitude of resonance to a non-damaging or non-destructive level. For example, the resonance avoidance program 150 may determine that the entrance of the robotic device previously described as beginning traversal of an industrial walkway places the walkway into resonance when aggregated with the movement of other entities already on the walkway. Once the determination that damage may occur is established, the resonance avoidance program 150 may continue simulating the industrial walkway under one or more other simulations that show which changes remove the resonance. In at least one embodiment, the resonance avoidance program 150 may select the one or more changes to the movement of each entity that is the least impactful to the speed and/or time of traversal of each entity. For example, the resonance avoidance program 150 may determine that the resonance may be avoided if some entities traverse the previously mentioned industrial walkway with an alternating frequency to other entities thereby canceling out the resonance.

In one or more other embodiments, the resonance avoidance program 150 may determine that one or more environmental factors may be temporarily added to the structure to either eliminate the resonance or prevent damage caused by the resonance. For example, if the digital twin simulation determines that resonance has been achieved and may cause damage to an elevated walkway, the resonance avoidance program 150 may engage temporary supports that provide further rigidity to the structure and prevent damage the resonance may cause. Similarly, the resonance avoidance program 150 may add live load to the structure that effectively removes the resonance by changing the natural frequency of the structure.

In yet another embodiment, the resonance avoidance program 150 may determine that only a preconfigured number of entities may traverse the structure at a single time in order to avoid resonance. Therefore, once the preconfigured number of traversing entities has been achieved, the resonance avoidance program 150 may prevent further entities from beginning traversal of the structure until the number of traversing entities has fallen below the threshold. For example, if three robotic devices are traversing an elevated walkway and the addition of a fourth may cause the walkway to begin resonance based on the calculated aggregated movement, the resonance avoidance program 150 may transmit a signal to a fourth robotic entity about to begin traversal to wait before traversing the walkway until the resonance avoidance program 150 determines one of the three original robotic devices completes its traversal. Similarly, if the entity about to begin traversal of the elevated walkway is a human, the resonance avoidance program 150 may display a warning message at the entrance to the elevated walkway that provides a warning of the dangers traversal may cause due to the resonance that may result from the human's traversal. Additionally, the resonance avoidance program 150 may present a warning message on a graphical user interface of a corresponding user device associated with the human about to begin traversal, such as EUD 103.

In still another embodiment, the resonance avoidance program 150 may react differently if each traversing entity is a human. When many humans are traversing a structure and that traversal may create resonance, providing adequate and timely alerts to change a walking gait may be ineffective or untimely. As such, the resonance avoidance program 150 may utilize one or more robotic devices with varying movements to change the aggregated movement frequency experienced by the structure thereby eliminating or reducing the amplitude of the resonance forces. For example, if a parade is crossing a small bridge and the foot traffic crossing the bridge is simulated as causing resonance, the resonance avoidance program 150 may instruct one or more robotic devices to deploy to the bridge span and apply terrestrial locomotive forces at a frequency that will reduce or remove the resonance. It should be noted that any deployment of additional robotic devices to a structure or pathway may only be instructed by the resonance avoidance program 150 when the aggregated weight of the existing entities and the additional robotic devices do not exceed structural weight limits and cause failure.

Next, at 312, the resonance avoidance program 150 transmits one or more changes to each corresponding entity. Once the resonance avoidance program 150 identifies changes to each entity's traversal in order to avoid resonance, the resonance avoidance program 150 may transmit instructions to each entity to make the indicated changes to their respective movements. For example, a series of robotic devices needing changes to their traversal movements in order to avoid resonance may have computer-readable instructions transmitted to them through WAN 102.

In at least one embodiment, the resonance avoidance program 150 may generate and transmit an aggregate movement plan of the entities to each individual entity and allow the entities to collaborate as to the changes that each entity will perform. For example, the resonance avoidance program 150 may generate an overarch movement plan that eliminates resonance caused by three robotic devices traversing a walkway and then transmit the plan to each of the three entities. Using onboard processing capabilities, each robotic device may determine necessary movements (e.g., location changes and locomotion changes) that should be taken in conjunction with the other robotic device that eliminates resonance.

In yet another embodiment, if the entities are human, the resonance avoidance program 150 may provide notification of the identified changes each individual. For example, continuing the previous situation where a parade is traversing a small bridge that may experience resonance by the group of individuals walking in unison across the bridge span, the resonance avoidance program 150 may present to a group organizer or parade conductor that resonance is being experienced or likely to be experienced on the bridge and to have the group of individuals stop, slow, or speed up movement in order to reduce or eliminate the possibly destructive resonance.

It may be appreciated that FIGS. 2 and 3 provide only an illustration of one implementation and do not imply any limitations with regard to how different embodiments may be implemented. Many modifications to the depicted environments may be made based on design and implementation requirements. For example, if the resonance avoidance program 150 determines that structural changes may be needed to a structure to avoid resonance across a specific section of a structure due to repeated and/or predicted traversal by a plurality of entities, the resonance avoidance program 150 may propose specific structural changes to the structure in a knowledge corpus, such as storage 124 and remote database 130.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, comprising:
    identifying one or more robotic entities, capable of terrestrial locomotion, traversing a structure;
    identifying movement information, historical traversal information, and characteristic information for the one or more entities and physical attributes of the structure;
    identifying entity types typically traversing the structure based on the historical traversal information;
    performing a digital twin simulation of the structure based on the identified movement information and the identified characteristic information;
    determining whether the structure will be damaged or fail due to resonance being achieved for a preconfigured period of time based on the digital twin simulation;
    in response to determining the structure will be damaged or fail, generating a movement plan comprising one or more movement changes for each entity to eliminate resonance on the structure;
    deploying an additional robotic entity capable of terrestrial locomotion to the structure;
    determining terrestrial locomotive forces for the additional robotic entity that reduce or remove the resonance of the structure;
    transmitting instructions to the additional robotic entity that cause the additional robotic entity to apply the terrestrial locomotive forces to the structure.

2. The method of claim 1, further comprising:
    generating a digital twin of the structure based on captured layout information and the identified entity types.

3. The method of claim 2, further comprising:
    generating a digital twin of each entity based on the movement information and characteristic information.

4. The method of claim 1, wherein identifying the one or more movement changes is further based on a plurality of metrics comprising total weight of all entities traversing the structure, movement of live loads across the structure, location of each live load, total applied force to the structure, an aggregated frequency to the structure by the one or more entities, an aggregated amplitude applied to the structure by the one or more entities, and a natural frequency of the structure.

5. The method of claim 1, wherein the one or more movement changes are selected from a group consisting of changing a pace of movement, changing an ambulation rate of an entity, changing a force with which an entity ambulates, changing an entity's location on the structure, changing an entity's location in relation to other entities on the structure, and changing a total number of entities present on the structure.

6. The method of claim 1, wherein the structure comprises a surface used to traverse from a starting point to a destination point.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying one or more robotic entities, capable of terrestrial locomotion, traversing a structure;
identifying movement information, historical traversal information, and characteristic information for the one or more entities and physical attributes of the structure;
identifying entity types typically traversing the structure based on the historical traversal information;
performing a digital twin simulation of the structure based on the identified movement information and the identified characteristic information;
determining whether the structure will be damaged or fail due to resonance being achieved for a preconfigured period of time based on the digital twin simulation;
in response to determining the structure will be damaged or fail, generating a movement plan comprising one or more movement changes for each entity to eliminate resonance on the structure;
deploying an additional robotic entity capable of terrestrial locomotion to the structure;
determining terrestrial locomotive forces for the additional robotic entity that reduce or remove the resonance of the structure;
transmitting instructions to the additional robotic entity that cause the additional robotic entity to apply the terrestrial locomotive forces to the structure.

8. The computer system of claim 7, further comprising:
generating a digital twin of the structure based on captured layout information and the identified entity types.

9. The computer system of claim 8, further comprising:
generating a digital twin of each entity based on the movement information and characteristic information.

10. The computer system of claim 7, wherein identifying the one or more movement changes is further based on a plurality of metrics comprising total weight of all entities traversing the structure, movement of live loads across the structure, location of each live load, total applied force to the structure, an aggregated frequency to the structure by the one or more entities, an aggregated amplitude applied to the structure by the one or more entities, and a natural frequency of the structure.

11. The computer system of claim 7, wherein the one or more movement changes are selected from a group consisting of changing a pace of movement, changing an ambulation rate of an entity, changing a force with which an entity ambulates, changing an entity's location on the structure, changing an entity's location in relation to other entities on the structure, and changing a total number of entities present on the structure.

12. The computer system of claim 7, wherein the structure comprises a surface used to traverse from a starting point to a destination point.

13. A computer program product, the computer program product comprising:
one or more computer-readable tangible storage medium and program instructions stored on at least one of the one or more tangible storage medium, the program instructions executable by a processor capable of performing a method, the method comprising:
identifying one or more robotic entities, capable of terrestrial locomotion, traversing a structure;
identifying movement information, historical traversal information, and characteristic information for the one or more entities and physical attributes of the structure;
identifying entity types typically traversing the structure based on the historical traversal information;
performing a digital twin simulation of the structure based on the identified movement information and the identified characteristic information;
determining whether the structure will be damaged or fail due to resonance being achieved for a preconfigured period of time based on the digital twin simulation;
in response to determining the structure will be damaged or fail, generating a movement plan comprising one or more movement changes for each entity to eliminate resonance on the structure;
deploying an additional robotic entity capable of terrestrial locomotion to the structure;
determining terrestrial locomotive forces for the additional robotic entity that reduce or remove the resonance of the structure;
transmitting instructions to the additional robotic entity that cause the additional robotic entity to apply the terrestrial locomotive forces to the structure.

14. The computer program product of claim 13, further comprising:
generating a digital twin of the structure based on captured layout information and the identified entity types.

15. The computer program product of claim 14, further comprising:
generating a digital twin of each entity based on the movement information and characteristic information.

16. The computer program product of claim 13, wherein identifying the one or more movement changes is further based on a plurality of metrics comprising total weight of all entities traversing the structure, movement of live loads across the structure, location of each live load, total applied force to the structure, an aggregated frequency to the structure by the one or more entities, an aggregated amplitude applied to the structure by the one or more entities, and a natural frequency of the structure.

17. The computer program product of claim 13, wherein the one or more movement changes are selected from a group consisting of changing a pace of movement, changing an ambulation rate of an entity, changing a force with which an entity ambulates, changing an entity's location on the structure, changing an entity's location in relation to other entities on the structure, and changing a total number of entities present on the structure.

18. The method of claim 1, wherein the physical attributes comprise a structural layout, a walkway length, a walkway width, a walkway floor thickness, a construction material of each walkway, a number of supports, a location of each support, a hand rail height, a hand rail design, and a location of each handrail support connected to the walkway.

19. The computer system of claim 7, wherein the physical attributes comprise a structural layout, a walkway length, a walkway width, a walkway floor thickness, a construction material of each walkway, a number of supports, a location of each support, a hand rail height, a hand rail design, and a location of each handrail support connected to the walkway.

20. The computer program product of claim 13, wherein the physical attributes comprise a structural layout, a walkway length, a walkway width, a walkway floor thickness, a construction material of each walkway, a number of supports, a location of each support, a hand rail height, a hand rail design, and a location of each handrail support connected to the walkway.

\* \* \* \* \*